United States Patent
Ocampo

(10) Patent No.: US 7,120,598 B2
(45) Date of Patent: Oct. 10, 2006

(54) METHOD FOR MANAGING AN INVESTMENT PORTFOLIO

(75) Inventor: Juan Manuel Ocampo, New York, NY (US)

(73) Assignee: Demand Insights LLC, New York, NY (US)

( * ) Notice: Subject to any disclaimer, the term of this patent is extended or adjusted under 35 U.S.C. 154(b) by 226 days.

(21) Appl. No.: 10/412,111

(22) Filed: Apr. 11, 2003

(65) Prior Publication Data

US 2004/0054612 A1   Mar. 18, 2004

Related U.S. Application Data

(60) Provisional application No. 60/411,652, filed on Sep. 18, 2002.

(51) Int. Cl.
*G06F 17/60* (2006.01)
(52) U.S. Cl. .................. 705/35; 705/36 R; 705/37
(58) Field of Classification Search ............. 705/36
See application file for complete search history.

(56) References Cited

U.S. PATENT DOCUMENTS

| 5,193,056 A | | 3/1993 | Boes ............... 364/408 |
| 5,742,775 A | * | 4/1998 | King ............... 705/38 |
| 5,806,048 A | * | 9/1998 | Kiron et al. ............. 705/36 |
| 5,812,987 A | * | 9/1998 | Luskin et al. ............ 705/36 |

FOREIGN PATENT DOCUMENTS

EP        000434877 A1 *  12/1989

OTHER PUBLICATIONS

Frank K. Reilly and Keith c. Brown, Investment Analysis and Portfolio Management, 5th ed., the Dryden Press, 1997, pp. 23 24, 526-536, 819,820 and 828-830.*
Diana Cawford, Strategic Investing Seeks Fine Balance, Toronto Star, Toronto, Ont., Jan. 15, 2000, p. 1.*
Reilly et al. "Investment Analysis and Portfolio Management, 5th Edition", The Dryen Press, 1997.
International Search Report Application No. PCT/US03/29495, dated Mar. 31, 2004.

* cited by examiner

*Primary Examiner*—Vincent Millin
*Assistant Examiner*—Debra Charles
(74) *Attorney, Agent, or Firm*—Fish & Neave IP Group of Ropes & Gray LLP; Jeffrey H. Ingerman

(57) ABSTRACT

There is provided a method for managing an investment portfolio. The method includes determining a feasible change in value of a first asset, and determining an allocation between the first asset and a second asset based on the feasible change in value of the first asset. The second asset appreciates over a holding period, and the allocation yields an expected minimum future value for the investment portfolio.

9 Claims, 5 Drawing Sheets

METHOD FOR MANAGING AN INVESTMENT PORTFOLIO

This application is claiming priority of U.S. Patent Application No. 60/411,652 filed on Sep. 18, 2002, the content of which is incorporated in its entirety herein by reference.

BACKGROUND OF THE INVENTION

1. Field of the Invention

The present invention relates to investment portfolios, and more particularly, to protecting a future value of an investment portfolio.

2. Description of the Related Art

Principal protected mutual funds offer investors a guarantee of principal, adjusted for fund dividends and distributions, on a set future date (maturity) while providing exposure to, i.e., participation in, higher risk and higher expected return asset classes such as equities. These appealing properties have led to considerable interest on the part of investors who have invested billions of dollars in such mutual funds in recent years. The usefulness and attractiveness of these principal protected mutual funds is limited by three factors:

(1) These funds are closed to new contributions (i.e., investor share purchases) during their protected (or guarantee) periods, unlike most mutual funds, which are open to contributions as well as redemptions on an ongoing basis.

(2) These funds are limited to a maximum maturity that corresponds to the duration of the high grade zero-coupon bonds in which they can invest.

(3) These funds protect initial principal for those mutual fund shares that are held to maturity, but interim gains generated on such principal are not protected.

There is a need for an investment portfolio that is not constrained by these factors.

SUMMARY OF THE INVENTION

The present invention provides a method for managing an investment portfolio. The method includes determining a feasible change in value of a first asset, and determining an allocation between the first asset and a second asset based on the feasible change in value of the first asset. The second asset appreciates over a holding period, and the allocation yields an expected minimum future value for the investment portfolio.

Another method for managing an investment portfolio includes allocating holdings of an investment portfolio among assets of the investment portfolio such that a value of the investment portfolio on a maturity date that is subsequent to an inception date is at least a given fraction of a highest marked-to-market value for the investment portfolio that occurred on or between the inception date and the maturity date.

An embodiment of the present invention is an investment portfolio. The investment portfolio includes an inception date, a maturity date subsequent to the inception date, and a value that is periodically marked-to-market. The value is protected such that at the maturity date the value is at least a given fraction of a highest marked-to-market value that occurred on or between the inception date and the maturity date.

Another embodiment of the present invention is an investment portfolio that includes a composition of assets having (a) a first subset of the composition of assets and (b) a second subset of the composition of assets, wherein the second subset contains the composition of assets that are not members of the first subset. The composition of assets is allocated between the first subset and the second subset based on an allocation between assets in the first subset, such that an expected return for the investment portfolio is maximized while ensuring that a total value for the investment portfolio at a given future date is at least a target minimal value.

Yet another embodiment of the present invention is an investment portfolio that includes a composition of assets, and a maturity date. The composition of assets is in an allocation that is rebalanced over time to achieve a target yield to the maturity date for the investment portfolio.

DESCRIPTION OF THE INVENTION

Figure 1:
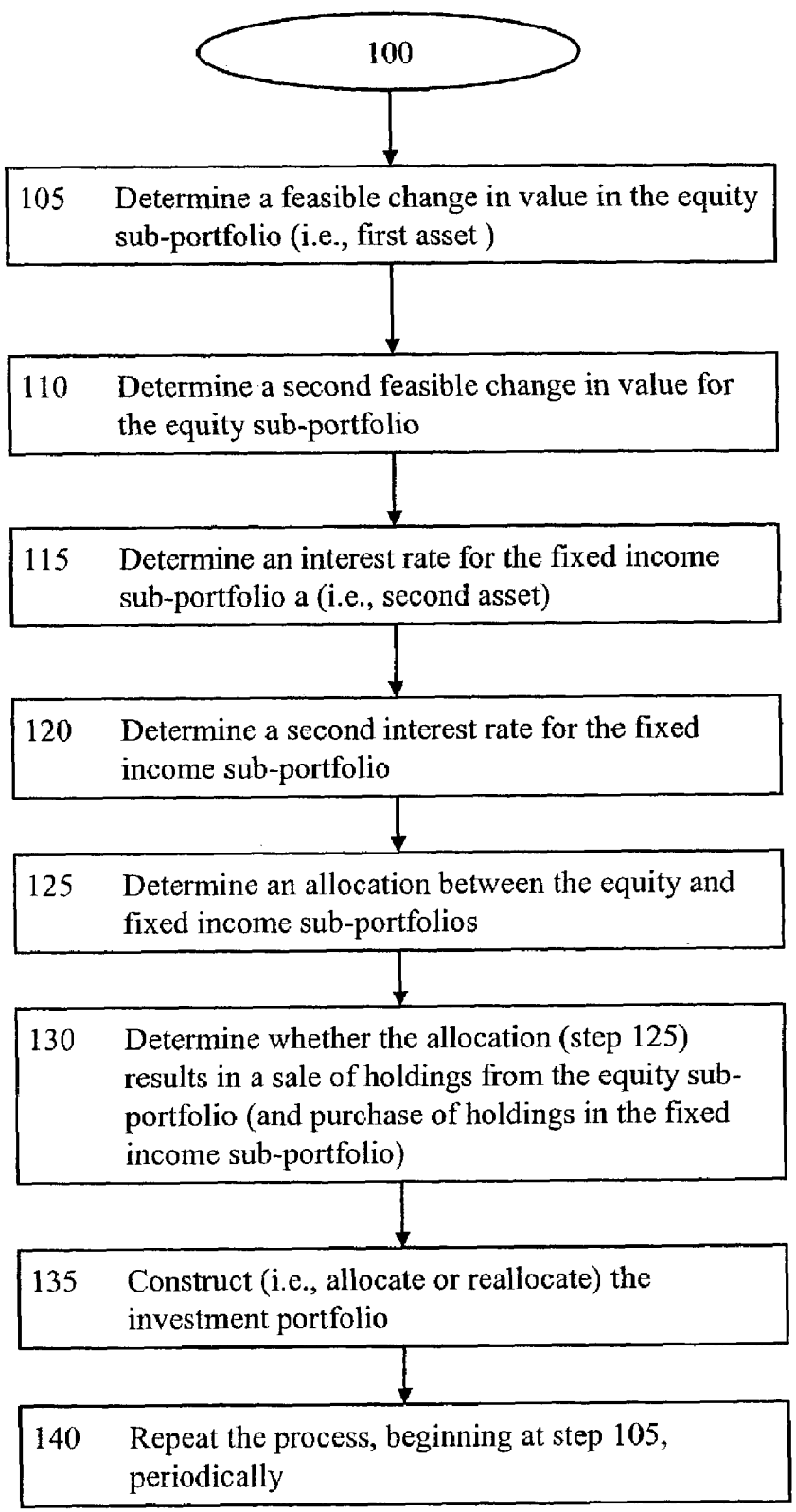
FIG. 1 is a flowchart of a method for protecting a future value of an investment portfolio.

FIG. 1 is a flowchart of a method 100 for protecting a future value of an investment portfolio. For purpose of example, the investment portfolio is described herein as having two assets, namely a first asset and a second asset, but in general, any number of assets may be included. The first asset is also referred to herein for purpose of example as an equity sub-portfolio, thus recognizing that the first asset can include other assets. The second asset is also referred to herein for purpose of example as a fixed income sub-portfolio, thus recognizing that the second asset can also include other assets.

Generally, method 100 includes determining a feasible change in value of the first asset, and determining an allocation between the first asset and the second asset based on the feasible change in value of the first asset. The second asset appreciates over a holding period, and the allocation yields an expected minimum future value for the investment portfolio. The holding period for the second asset can be any desired period of time. A particularly useful holding period, as used throughout this description, reflects a portfolio's remaining time-to-maturity. Method 100 commences with step 105.

In step 105, method 100 determines a feasible change in value of the first asset. The first asset can constitute a risky asset sub-portfolio such as one containing equities. A particularly useful feasible change in value relates to a probable maximum loss (PML) that the first asset may generate. That is, the feasible change in value of the first asset is a maximum probable loss in value of the first asset. A PML is defined herein as the largest fractional loss in value that an asset may sustain over a holding period with a statistically high level of confidence, for example, such that the actual loss will not exceed the PML over 99% of such holding periods. This PML can be estimated in a number of ways, such as a statistical analysis of prior historical returns of similar assets or stochastic simulation employing Monte Carlo models. Method 100 progresses from step 105 to step 110.

Step 110 is an optional step in which method 100 considers multiple sets of conditions relating to the first and second asset. It is often desirable to reflect more than one feasible pair of conditions, for example, of equity PMLs and probable minimum effective fixed income yields, in constructing an investment portfolio. For example, the PML of a diversified portfolio of US corporate equities is much greater for a three-year holding period than it is for a 20-year holding period.

In step 110, method 100 determines a second feasible change in value for the first asset, e.g., the equity sub-portfolio. Consider the feasible change in value of the first asset to be a first feasible change and the interest rate for the second asset to be a first interest rate that together are regarded as a first pair of conditions. Step 110 would include determining a second feasible change in value for the first asset and a second interest rate for the second asset for a second pair of conditions. Determining the allocation between the first asset and the second asset (described in step 125) considers the first and second pair of conditions. Although step 110 is described herein as considering two pairs of conditions, in practice it may consider any number of pairs of conditions. Method 100 progresses from step 110 to step 115.

In step 115, method 100 determines an interest rate for the second asset. The appreciation of the second asset over the holding period can be calculated by determining the interest rate for the second asset where determining the allocation between the first asset and the second asset considers the interest rate for the second asset. Since interest rates change from time to time in the financial markets, it is useful to consider such feasible changes in interest rates in determining the interest rate that will be deemed to govern the appreciation of the second asset over the holding period, thus, determining the interest rate for the second asset considers feasible changes in interest rates. It is of further use to determine a probable minimum effective yield for the second asset and utilize the yield as the value for the interest rate, thus, the determination of the interest rate for the second asset includes determining a probable minimum effective yield for the second asset. A probable minimum effective yield is defined herein as the lowest effective annualized yield over a holding period that an asset or portfolio will realize with a high level of confidence, for example, such that the actual effective yield attained will be equal to or greater than the probable minimum effective yield over 99% of such holding periods. The probable minimum effective yield takes into account the reinvestment risk inherent in rolling coupon and maturing principal payments into holdings bearing lower rates of interest than those that prevailed at the start of a holding period. Numerous quantitative techniques such as a reinvestment roll analysis can be employed to determine a probable minimum effective yield. Method 100 progresses from step 115 to step 120.

In step 120, method 100 determines a second interest rate for the second asset. Method 100 employs step 120 if and only if optional step 110 is employed. Consider for example that the reinvestment risk corresponding to a coupon bond portfolio is much greater for a 20-year holding period than it is for a three-year holding period. This added reinvestment risk results in a lower probable minimum effective yield for the longer holding period. Since identical assets possess different risk profiles over different holding periods, method 100 reflects these different risk profiles through use of multiple conditions. Although step 120 is described herein as considering two pairs of conditions, in practice it may consider any number of pairs of conditions. Method 100 progresses from step 120 to step 125.

In step 125, method 100 determines an allocation of funds between the 30 first asset and the second asset. The allocation can be determined by employing a formula:

$$R = (FV/CV - (1-x))/((1+r)^m - (1-x))$$

where:
R = a fractional allocation of the total investment portfolio to the second asset,
x = a fractional representation of the feasible change in value of the first asset,
FV = the expected minimum future value,
CV = an amount available for investment,
r = the interest rate for the second asset, and
m = a number of years from a date of investment to a date corresponding to the future value.

This formula generates a unique allocation of the two assets for a given span of time between the investment and future value dates, referred to subsequently as time-to-maturity. The formula determines the fractional allocations of the first and second assets such that feasible losses of the first asset are offset by sufficient expected appreciation of the second asset such that the targeted minimum future value (FV or Protected Value) of the total portfolio is generated at the future value date.

In a case where step 110 was executed, step 125 employs the following formula to calculate an appropriate allocation of assets for the investment portfolio.

$$R = \max \{(FV/CV - (1-x_1))/((1+r_1)^m - (1-x_1)), (FV/CV - (1-x_2))/((1+r_2)^m - (1-x_2))\}$$

where:
R = a fractional allocation of the total investment portfolio to the second asset,
FV = the expected minimum future value,
CV = an amount available for investment,
$x_1$ = a fractional representation of the first feasible change in value of the first asset,
$r_1$ = the first interest rate for the second asset,
m = a number of years from a date of investment to a date corresponding to the future value,
$x_2$ = a fractional representation of the second feasible change in value of the first asset, and
$r_2$ = the second interest rate for the second asset.

This formula protects the FV of the portfolio for whichever of multiple conditions constitutes the greatest risk of shortfall (i.e., failure to attain the minimum future value at the future value date) at any given time-to-maturity, without having to forecast which of these conditions will constitute the greatest risk for any particular point in time. Although this formula considers the maximum of two terms, in practice it may consider any number of terms, corresponding to the number of pairs of conditions considered by method 100. Method 100 progresses from step 125 to step 130.

In step 130, method 100 determines whether the allocation determined in step 125 results in a sale of holdings from the first asset and a purchase of holdings for the second asset. It is useful to subject the portfolio allocation determined in step 125 to a test such that the allocation from step 125 is treated as a proposed allocation, rather than a final allocation for that point in time. Assume the allocation of step 125 to be a proposed allocation, and that the investment portfolio has a present allocation between the first asset and the second asset. In step 130, method 100 includes determining whether to reallocate from the present allocation to the proposed allocation, based on whether a reallocation requires a sale of a quantity of the first asset and a purchase of a quantity of the second asset.

For example, where the investment portfolio is rebalanced over time, e.g., on each trading day, and where the prior period rebalancing was such that the allocation to the second asset was exactly sufficient to protect a minimum FV, then that second asset is still needed to protect such value irrespective of daily changes in the value of the investment portfolio. In this case, such as that which applies in protecting the maximum value over time of a portfolio that is marked-to-market, the proposed allocation from step 125 is executed if and only if it results in a sale of first asset holdings and purchase of second asset holdings. That is, method 100 includes reallocating between the first asset and the second asset in accordance with the proposed allocation if the reallocation requires a sale of a quantity of the first asset and a purchase of a quantity of the second asset. Method 100 progresses from step 130 to step 135.

In step 135, method 100 constructs the investment portfolio. That is, it allocates, or reallocates, between the first and second asset. Method 100 progresses from step 135 to step 140.

In step 140, method 100 loops back to step 105 so that method 100 is performed periodically. That is, determining the allocation (or the proposed allocation) and determining whether to allocate (or reallocate) are performed periodically. When method 100 is performed periodically, and where the critical parameters (e.g., the values for x and r) are determined appropriately (e.g., where x reflects a probable maximum equity loss and r reflects a probable minimum effective fixed income yield) then method 100 will provide an investment portfolio that will protect a maximum marked-to-market value between an investment portfolio's inception and maturity dates on the maturity date where the frequency (time interval) of portfolio rebalancing corresponds to frequency of the mark to market.

Method 100 can also be employed using different values for its critical parameters so that a targeted fractional value, for example 90%, of the portfolio's maximum marked-to-market value is protected at maturity.

An investment portfolio that is marked-to-market at the close of each trading day and that is managed in accordance with method 100 at the close of each trading day will enjoy the protection described above. Thus, such an investment portfolio includes an inception date, a maturity date subsequent to the inception date, and a value that is periodically marked-to-market. The value of the investment portfolio is protected such that at the maturity date the value of the investment portfolio is at least a given fraction of a highest marked-to-market value that occurred on or between the inception date and the maturity date.

Figure 2:
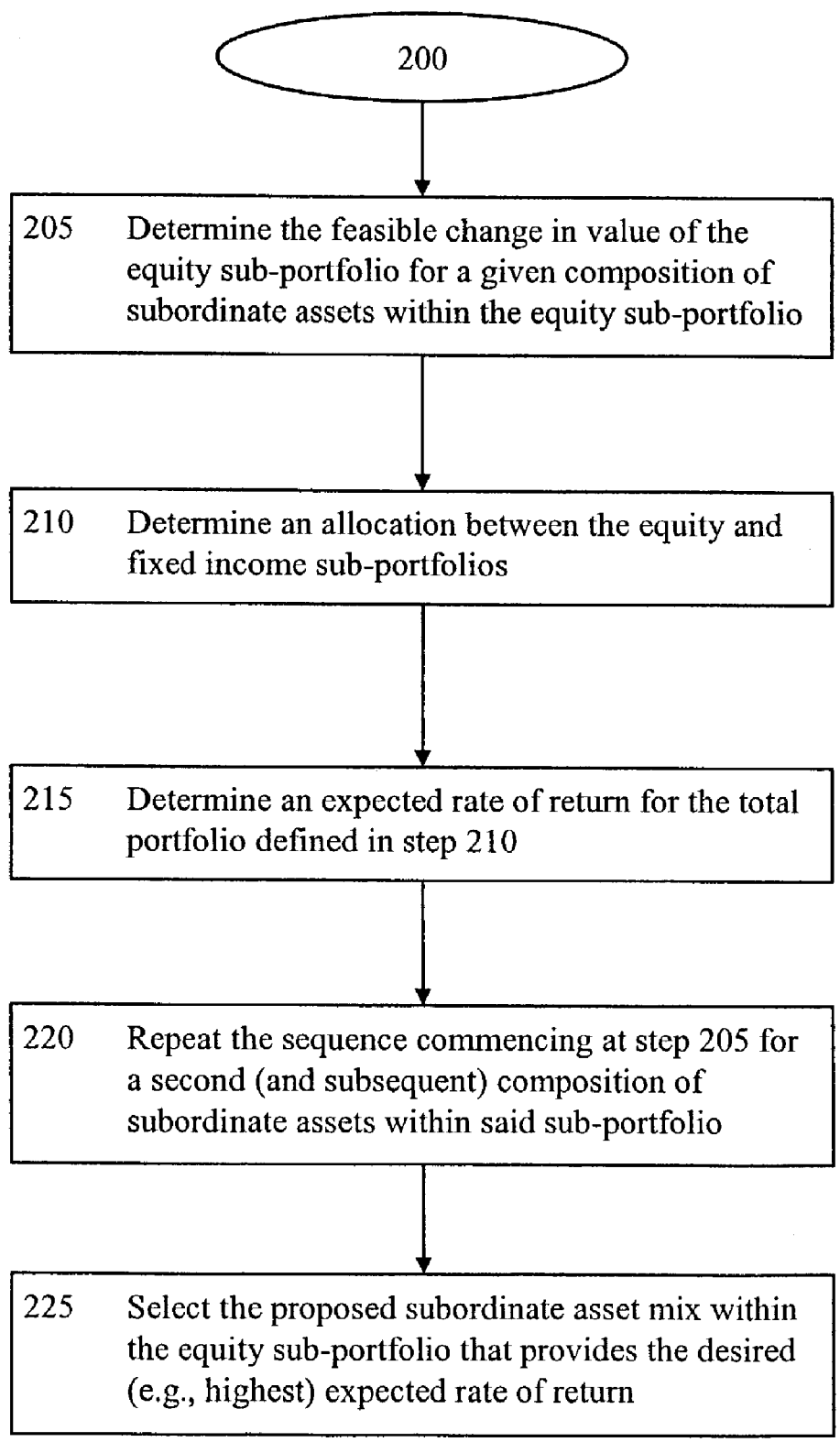
FIG. 2 is a flowchart of a method for equity optimization within a marked-to-market investment portfolio that protects a future value.

FIG. 2 is a flowchart of a method 200 for equity optimization within a marked-to-market investment portfolio that protects a future value. Method 200 determines the composition of a sub-portfolio, for example, an equity sub-portfolio that may contain many different assets including futures, options and other derivative instruments, within an investment portfolio that seeks to attain, i.e., protect, at least a certain minimum value at a future date.

Assume that the investment portfolio includes a first asset and a second asset as described for method 100, and that the first asset includes subordinate assets. For method 200 determining the feasible change in value of the first asset and determining the allocation are performed for a proposed mix of the subordinate assets, and the allocation is a proposed allocation. Generally, method 200 also includes determining an expected rate of return for the investment portfolio using the proposed mix and the proposed allocation. Method 200 commences with step 205.

In step 205, method 200 determines the feasible change in value, e.g., PML, of the first asset corresponding to a specific composition of the first asset. Method 210 progresses from step 205 to step 210.

In step 210, method 200 determines an allocation between the first asset and the second asset. This is a unique allocation between the first asset and the second asset, pursuant to method 100, such that the present value (PV) of the total investment portfolio is protected. Method 200 progresses from step 210 to step 215.

In step 215, method 200 determines an expected rate of return for the total investment portfolio, as defined in step 210. By determining the expected rate of return of the first asset and the expected appreciation of the second asset, method 200 can determine the expected return of the total investment portfolio from the unique allocation weightings that result from the allocation between the first and second assets. Method 200 progresses from step 215 to step 220.

In step 220, steps 205–215 are repeated for a second composition and, if desired, a further plurality of compositions of subordinate assets within the first asset. Assume the proposed mix is a first proposed mix, the proposed allocation is first proposed allocation, and the expected rate of return is a first expected rate of return. Step 220 includes determining a second proposed allocation and a second expected rate of return for the investment portfolio for a second proposed mix of the subordinate assets. Method 200 progresses from step 220 to step 225.

In step 225, method 200 selects one of the first or second proposed mixes based on the first and second expected rates of return. A single composition of subordinate assets within the first asset determines a single total portfolio allocation, and a particular composition of the subordinate assets is selected on the basis of the expected return for the total portfolio. Thus, in step 225, method 200 selects the proposed mix of subordinate assets within the first asset that provides a desired, e.g., highest, expected rate of return.

Steps 205–225 can be facilitated by quantitative analysis of the first asset for differing mixes of its subordinate assets. For example, method 200 can determine an efficient frontier of such subordinate asset mixes such that only the mix that generates the highest expected return for a given PML is considered for steps 210–225.

Method 200 will generate an investment portfolio whose total expected return is maximized while ensuring that a minimum target value for the investment portfolio is attained at a given future date. That is, the allocation between the first asset and the second asset is such that an expected return for the investment portfolio is maximized while ensuring that a total value for the investment portfolio at a given future date is at least a target minimal value.

Figure 3:
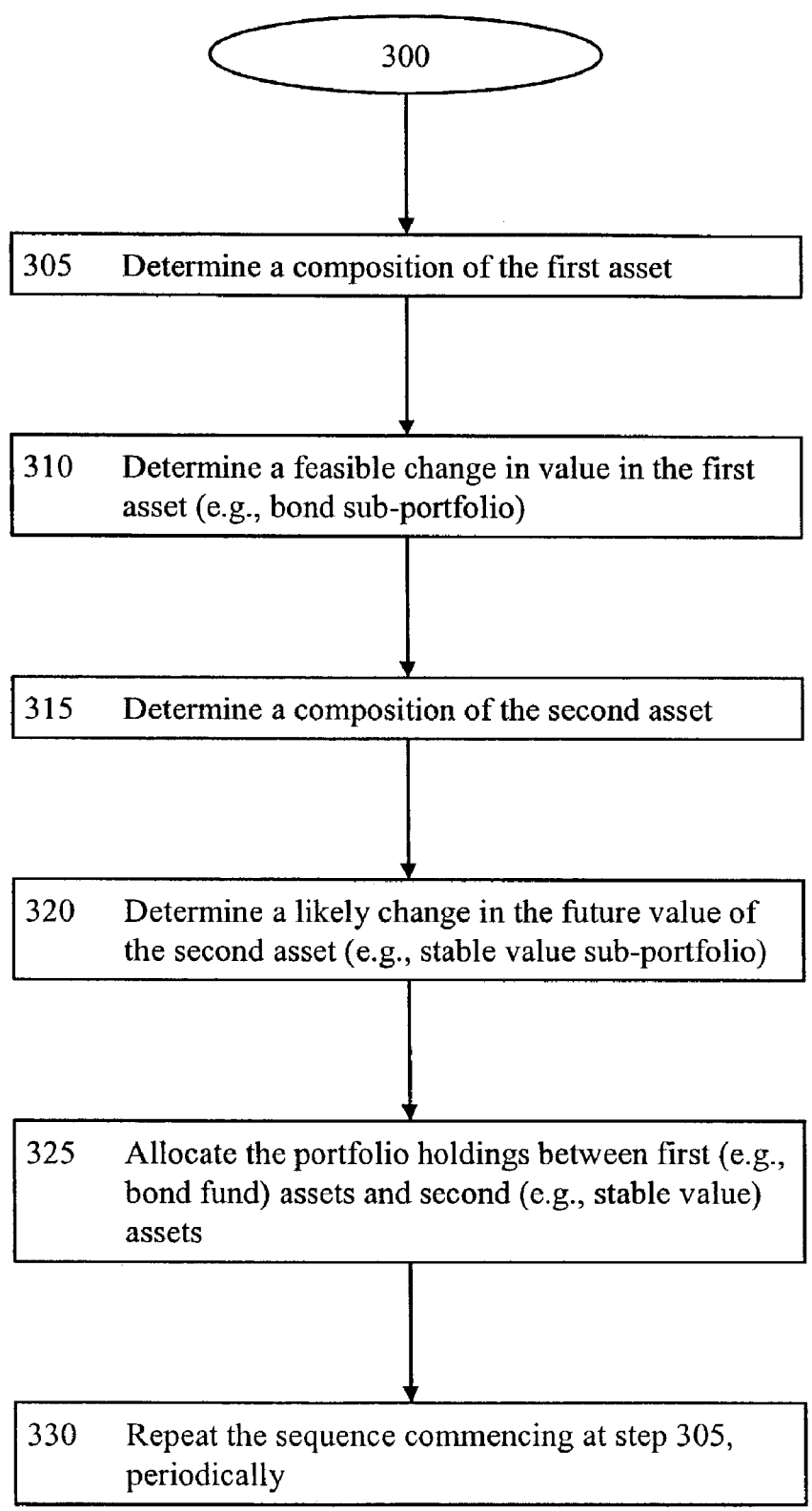
FIG. 3 is a flowchart of a method for optimizing fixed income within an investment portfolio.

FIG. 3 is a flowchart of a method 300 for optimizing fixed income within an investment portfolio. Method 300 constructs a portfolio that achieves a target yield to a given maturity date. Assuming an investment portfolio having first and second assets as described for method 100, generally, method 300 includes determining a likely change in a future value of the second asset, where determining the allocation between the first asset and the second asset also considers the likely change in the future value of the second asset. Method 300 commences with step 305.

In step 305, method 300 determines a composition of the first asset. For example, where the first asset comprises multiple bond sub-portfolios of varying durations, step 305 determines an appropriate mix of these sub-portfolios within the first asset. A particularly useful form of step 305 consists of allocating the bond sub-portfolios such that the duration of the first asset matches the time-to-maturity of the investment portfolio to the greatest extent possible given the durations of the first asset's bond sub-portfolios. It is of further use to select the unique mix of sub-portfolios possessing such a duration that generates the highest yield.

Where the first asset comprises a single sub-portfolio this step may be omitted and method 300 commences with step 310, otherwise method 300 progresses from step 305 to 310.

In step 310, method 300 determines a feasible change in value of the first asset. For example, a feasible change in value relating to a government bond sub-portfolio will be a function of a change in market yields, i.e., interest rates. Given characteristics of such a bond sub-portfolio, e.g., its duration, and a historical analysis of interest rate changes, a feasible change in value can be readily determined. Method 300 progresses from step 310 to step 315.

In step 315, method 300 determines a composition of the second asset. For example, when the second asset consists of multiple sub-portfolios such as money market and stable value sub-portfolios, step 315 determines an appropriate mix of the sub-portfolios within the second asset. A particularly useful form of step 315 consists of allocating money market and stable value sub-portfolios so that their yield sensitivity for given changes in a benchmark market yield best approximates a given targeted yield sensitivity, given the available sub-portfolios within the second asset and the investment portfolio's time-to-maturity. For example, this form of step 315 will generate a higher money market allocation and a correspondingly lower stable value allocations for the second asset where the investment portfolio's time-to-maturity is six months than would be the case where the investment portfolio's time-to-maturity is twelve months. Where the second asset comprises a single sub-portfolio, this step may be omitted, otherwise method 300 progresses from step 315 to step 320.

In step 320, method 300 determines a likely change in the future value of the second asset, e.g., a stable value sub-portfolio. It is particularly useful to determine this change in the future value of the second (stable value) asset such that it reflects the same market conditions, e.g., change in market interest rates, that give rise to the feasible change in value of the first asset, as determined in step 310. That is, determining the feasible change in value of the first asset and determining the likely change in the future value of the second asset consider a same set of market conditions.

For example, a given increase in interest rates will reduce the value of a given government bond sub-portfolio by a specific amount. It is particularly useful to determine the future value increase (at a specific future value date) that the stable value sub-portfolio is likely to enjoy as a direct consequence of the change in interest rates that determined the reduction in value of the bond sub-portfolio. Method 300 progresses from step 320 to step 325.

In step 315, method 300 allocates the holdings of the investment portfolio between the first (e.g., bond) asset and the second (e.g., stable value) asset. The allocation can follow a formula where the first asset's value is subject to price volatility and the second asset's value is not sensitive to price volatility, as is the case with the first asset being a bond sub-portfolio and the second asset being a stable value sub-portfolio. For example, the allocation between the first and second assets can be determined by the ratio:

$$\frac{(D_v)(\Delta r_v)}{(1 + r_s + \Delta r_s)^m - (1 + r_s)^m}$$

where:
$D_v$=duration, in years, of the first asset,
$\Delta r_v$=a feasible change in yield of the first asset,
$r_s$=a yield for the second asset,
$\Delta r_s$=a change in $r_s$ that corresponds, over period m, with $\Delta r_v$, and
m=years to maturity.

This ratio expresses a feasible change in value for the first asset (bond) for a given change in market interest rates in its numerator, and it expresses the likely change in the future value of the second (stable value) asset for the same change in market interest rates in its denominator. As a result, a portfolio that allocates its stable value assets and bond assets per this ratio will offset current value loss of the bond assets with future value appreciation in its stable value assets. An alternative means of determining the allocation between the first and second assets employs the following ratio:

$$\frac{(D_v)(\Delta r_v) + 0.5(C_v)(\Delta r_v)^2}{(1 + r_s + \Delta r_s)^m - (1 + r_s)^m}$$

where:
$D_v$=duration, in years, of the first asset,
$\Delta r_v$=a feasible change in yield of the first asset,
$C_v$=the convexity of the first asset
$r_s$=a yield for the second asset,
$\Delta r_s$=a change in $r_s$ that corresponds, over period m, with $\Delta r_v$, and
m=years to maturity.

This ratio is the same as the prior ratio except that it considers the convexity of the first asset. In situations where the first asset contains bonds having negative convexity, such as mortgage-backed securities or callable corporate bonds, it is particularly useful to use this second ratio. Method 300 progresses from step 325 to step 330.

In step 330, steps 305–325 are repeated periodically. Since the allocation ratio described above is a function of the time remaining between the allocation date and the future value date (m), the allocation sequence steps 305–325 should be repeated periodically until maturity, i.e., the future value date. That is, determining the feasible change in value of the first asset, determining the likely change in the future value of the second asset, and the allocation are performed periodically. When the sequence is performed periodically, it results in an investment portfolio that achieves a target yield to maturity. Thus, the allocation is rebalanced over time to achieve a target yield to a maturity date for the investment portfolio. This is a very valuable attribute in investment management. For example, a portfolio that achieves a target yield to maturity constitutes a useful proxy for a risk-free asset.

A proxy risk-free asset that is managed by method 300 is particularly useful in the construction of investment portfolios, including those containing risky assets, whose future value is protected, in a manner such as that of method 100.

Specifically, this proxy risk-free asset serves as a particularly favorable choice for the second asset of method 100.

Moreover, use of method 300 to construct (and manage over time via periodic reallocation) the proxy risk-free asset provides benefits not available from prior art methods for constructing a proxy risk-free asset portfolio, such as cash flow immunization. Method 300 does not require a match, or even an approximation of a match, between the duration of the portfolio and its time-to-maturity, as does a cash flow immunization. As method 300 does not require such a match, it provides greater flexibility in the selection of component assets (e.g., specific bonds) within the investment portfolio and it allows the maturity of a portfolio, whose future value is protected, to exceed the duration of its fixed income assets. It also allows the proxy risk-free asset to be constructed with few or no zero-coupon bonds, thus reducing the mark-to-market price volatility of the proxy risk-free asset and, consequently, the overall protected value portfolio.

Additionally, in situations where the investment portfolio is open to contributions over time, e.g., in the case of an open end fund, or where the future portfolio value to be protected changes over time, e.g., where the highest mark-to-market value between two dates is protected, method 300 allows an aggregate portfolio allocation between equity and fixed income sub-portfolios, which must be performed periodically for such portfolios, to reflect a more stable interest rate since a probable minimum effective yield for a fixed income (proxy risk-free asset) sub-portfolio managed by method 300 is less volatile, in terms of its day-to-day change, than a market-determined zero-coupon yield.

Method 300 allows multiple proxy risk-free asset portfolios, having different maturity dates, to be constructed and managed from as few as two sub-pools, e.g., one bond sub-pool and one stable value sub-pool, since each portfolio can be constructed through differing allocations of these same sub-pools without need for duration matching.

Figure 4:
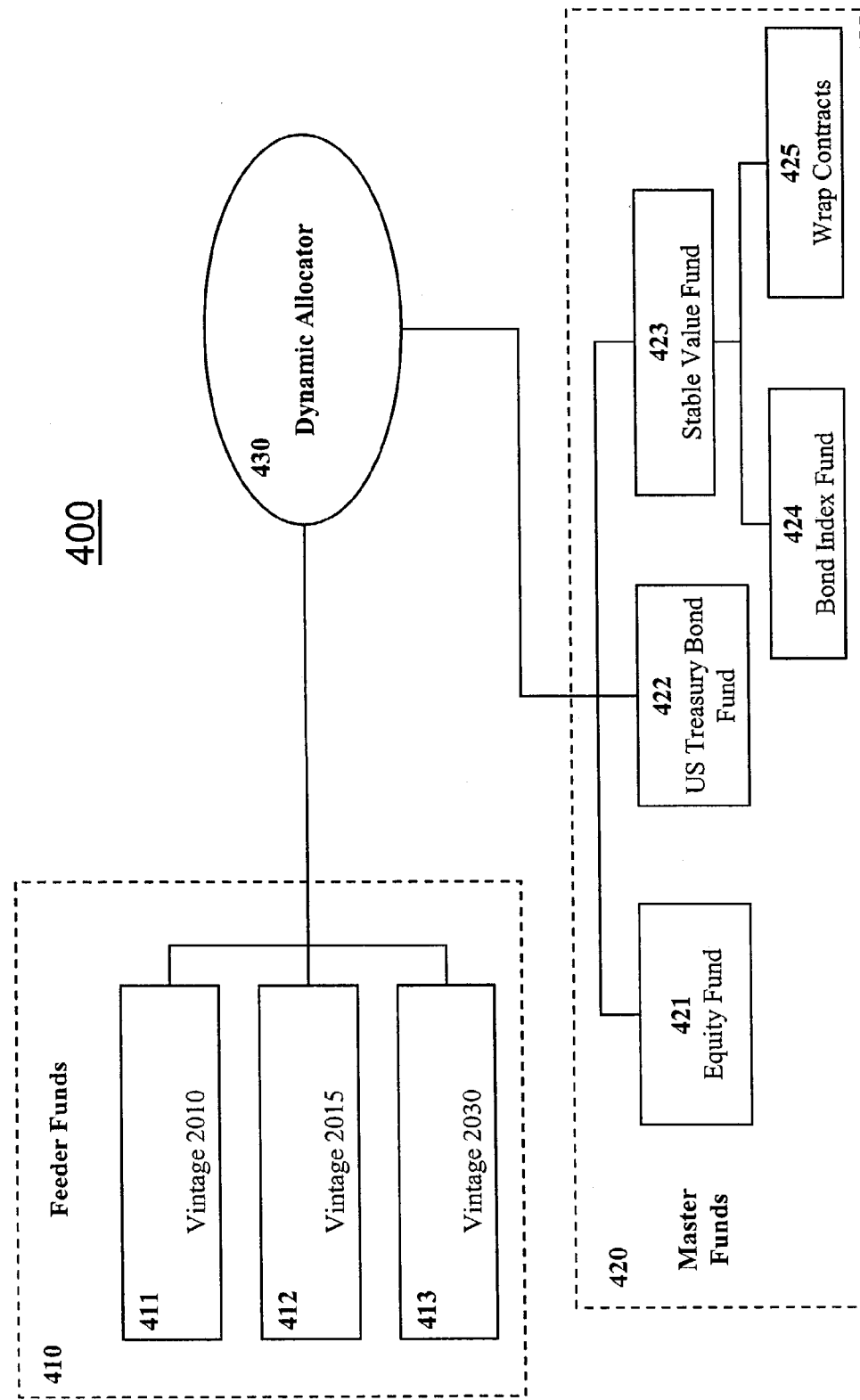
FIG. 4 is a block diagram of a mutual fund series that is managed by employment of the methods of FIGS. 1–3.

FIG. 4 is a block diagram of a mutual fund series 400 that is managed by employment of methods 100, 200 and 300. Mutual fund series 400 includes a series 410 of feeder mutual funds, a series 420 of master mutual funds, and a dynamic allocator 430.

Series 410 is shown, for purpose of example, as including three feeder mutual funds 411, 412 and 413. However, in practice the feeder funds need not be mutual funds, and series 410 can include any number of funds. Feeder mutual fund 411 (Vintage 2010) has a maturity date in the year 2010. Feeder mutual fund 412 (Vintage 2015) has a maturity date in the year 2015. Feeder mutual fund 413 (Vintage 2030) has a maturity date in the year 2030.

Each of feeder mutual funds 411, 412 and 413 shares an inception date in the present year. The value of each of feeder mutual funds 411, 412 and 413 is determined by its net asset value (NAV), and the NAV for each feeder mutual fund 411, 412 and 413 is determined at the close of trading on each day on which a stock exchange, e.g., the New York Stock Exchange, is open (trading day) by marking to market all of the assets and liabilities of each of feeder mutual funds 411, 412 and 413. Each feeder mutual fund 411, 412 and 413 issues shares whose value is determined by dividing the NAV by the number of shares outstanding.

An investor can buy or redeem shares on any trading day between the relevant inception and maturity dates for each feeder mutual fund 411, 412 and 413. On the maturity date of each feeder mutual fund 411, 412 and 413, the investors holding shares in the fund can redeem their shares at the highest NAV per share (adjusted for any distributions and dividends) achieved by fund at the close of any trading day between and including the fund's inception and maturity dates. On each of these dates, each feeder mutual fund 411, 412 and 413 holds, i.e., owns, shares of one or more master mutual funds in series 420 in an amount determined, on each trading day, by dynamic allocator 430. Two of the feeder mutual funds 412 and 413 have maturities that exceed the duration of a US government bond fund 422, which is described below.

Series 420 includes three master mutual funds, namely an equity fund 421, a US Treasury bond fund 422 and a stable value fund 423. Note that although series 420 is shown as having three master mutual funds, in practice, these funds need not be mutual funds, and series 420 can include any number of funds. Each of equity fund 421, US Treasury bond fund 422 and stable value fund 423 possesses a NAV and a NAV per share, which are determined in the same manner and with the same frequency as feeder mutual funds 411, 412 and 413. Each master mutual fund 421, 422 and 423 issues and redeems shares held by feeder mutual funds 411, 412 and 413.

Equity fund 421 holds equity securities. US Treasury fund 422 holds US government bonds having long maturities. Stable value fund 423 is composed of an intermediate maturity bond index fund 424 and stable value wrap contracts 425 of a type issued by insurance companies or other financial institutions. Stable value wrap contracts 425 increase or decrease in value, on each trading day, such that marked-to-market price changes in bond index fund 424 are offset by changes in the value of stable value wrap contracts 425. Stable value fund 423 appreciates over time by a crediting rate, similar to an interest rate, that is determined by a contractual formula agreed to with an issuing insurance company. The formula references an actual coupon yield of bond index fund 424.

Dynamic allocator 430 allocates the holdings of series 410 across series 420 employing the methods of the present invention as illustrated in FIGS. 1, 2 and 3. The allocation process is conducted on each trading day and results in the purchase or redemption (sale) of shares of equity fund 421, US Treasury bond fund 422 and stable value fund 423 such that each feeder mutual fund 411, 412 and 413:

(1) meets its redemption claims by its investors;

(2) invests new investor contributions, i.e., investor share purchases, in the appropriate series 420 funds, i.e., equity fund 421, US Treasury bond fund 422 and stable value fund 423; and (3) holds a portfolio of shares in each of funds 421, 422 and 423 such that its NAV per share at maturity will equal the highest NAV per share, adjusted for distributions and dividends, between inception and maturity.

Dynamic allocator 430 employs method 100 to determine the appropriate equity master fund (421) share holdings on each trading day for each feeder mutual fund 411, 412 and 413. Dynamic allocator 430 employs method 200 to determine the composition of equity fund 421. It employs method 300 to determine the appropriate share holdings for each of US Treasury bond fund 422 and stable value fund 423 for each feeder mutual fund 411, 412 and 413 on each trading day. Thus, dynamic allocator 430 manages an investment portfolio by allocating holdings of the investment portfolio among assets of the investment portfolio such that a value of the investment portfolio on a maturity date that is subsequent to an inception date is a highest marked to market value for the investment portfolio that occurred on or between the inception date and the maturity date.

Methods 100, 200 and 300 can be performed manually or automatically, for example, by a computer system.

Figure 5:
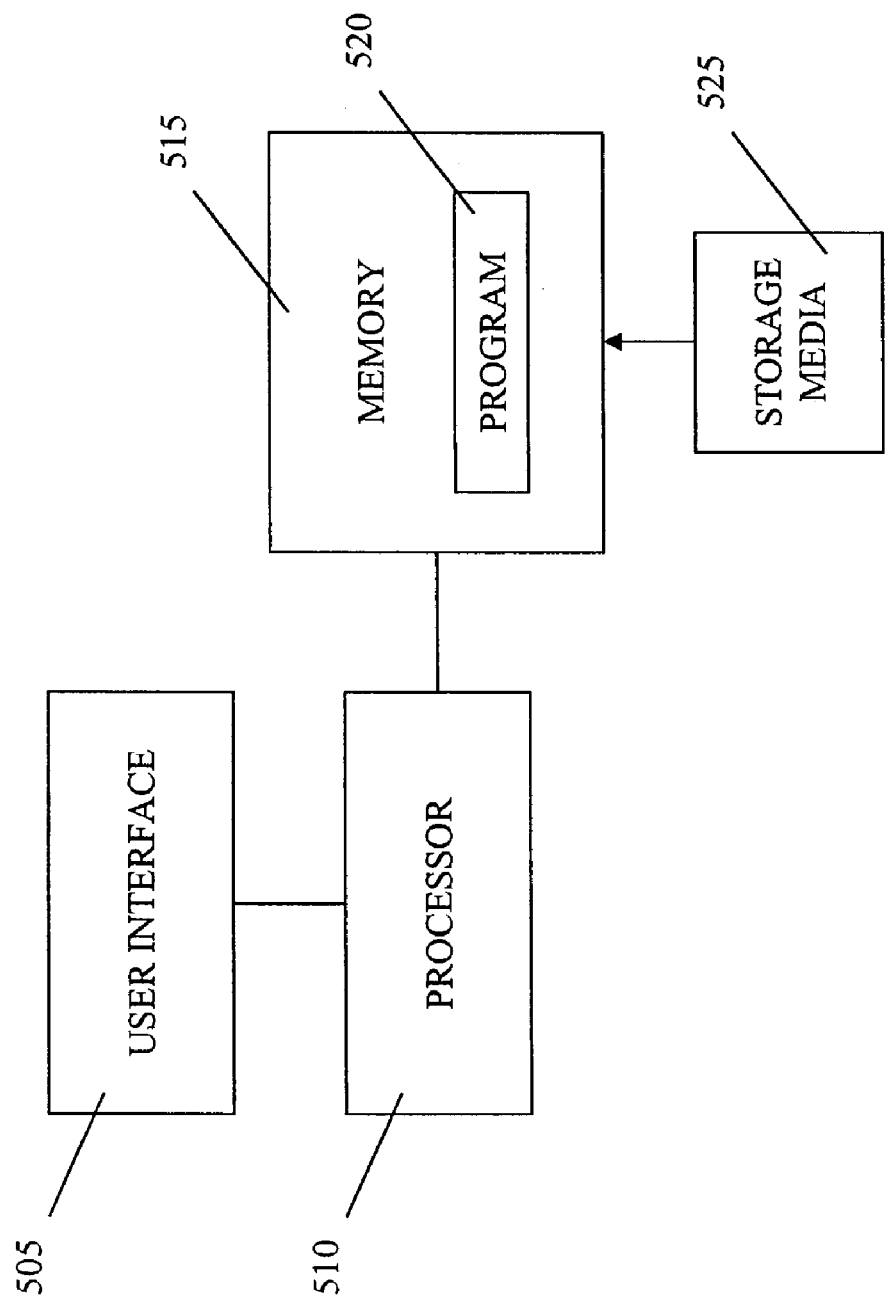
FIG. 5 is a block diagram of a computer system 500 configured for employment of the methods of FIGS. 1–3.

FIG. 5 is a block diagram of a computer system 500 configured for employment of methods 100, 200 and 300. System 500 includes a user interface 505, a processor 510, and a memory 515. System 500 may be implemented on a general purpose microcomputer, such as one of the members of the Sun™ Microsystems family of computer systems, one of the members of the IBM™ Personal Computer family, or any conventional work-station or graphics computer device. Although system 500 is represented herein as a standalone system, it is not limited to such, but instead can be coupled to other computer systems via a network (not shown).

Memory 515 is a memory for storing data and instructions for controlling the operation of processor 510. An implementation of memory 515 would include a random access memory (RAM), a hard drive and a read only memory (ROM). One of the components of memory 515 is a program 520.

Program 520 includes instructions for controlling processor 510 to execute methods 100, 200 and 300. Program 520 may be implemented as a single module or as a plurality of modules that operate in cooperation with one another. Program 520 is also contemplated as representing a software embodiment of dynamic allocator 430.

User interface 505 includes an input device, such as a keyboard or speech recognition subsystem, for enabling a user to communicate information and command selections to processor 510. User interface 505 also includes an output device such as a display or a printer. A cursor control such as a mouse, track-ball, or joy stick, allows the user to manipulate a cursor on the display for communicating additional information and command selections to processor 510.

While program 520 is indicated as already loaded into memory 515, it may be configured on a storage media 525 for subsequent loading into memory 515. Storage media 525 can be any conventional storage media such as a magnetic tape, an optical storage media, a compact disk, or a floppy disk. Alternatively, storage media 525 can be a random access memory, or other type of electronic storage, located on a remote storage system.

It should be understood that various alternatives and modifications of the present invention could be devised by those skilled in the art. The present invention is intended to embrace all such alternatives, modifications and variances that fall within the scope of the appended claims.

What is claimed is:

1. A computer-implemented method for managing an investment portfolio, said method comprising:

determining a feasible loss in value of a first asset;

determining an allocation between said first asset and a second asset based on said feasible loss in value of said first asset; and determining an interest rate for said second asset; wherein:

said allocation yields a protected minimum future value for said investment portfolio at a conclusion of said holding period, and is such that appreciation of said second asset over said holding period is sufficient to generate said protected minimum future value and offset said feasible loss in value of said first asset;

said protected minimum future value is at least a given fraction of a highest marked-to-market value of achieved by said investment portfolio; and said determining said allocation between said first asset and said second asset employs a formula:

$$R=(FV/CV-(1-x))/((1+r)^m-(1-x))$$

where:

R=a fractional allocation of said total investment portfolio to said second asset, x=a fractional representation of said feasible loss in value of said first asset, FV=said protected minimum future value, CV=an amount available for investment, r=said interest rate for said second asset, and m=a number of years from a date of investment to a date corresponding to said future value.

2. A computer-implemented method for managing an investment portfolio, said method comprising:

determining a first feasible loss in value of a first asset;

determining an allocation between said first asset and a second asset based on said first feasible loss in value of said first asset;

determining a first interest rate for said second asset;

determining a second feasible loss in value of a first asset; and determining a second interest rate for said second asset; wherein:

said allocation yields a protected minimum future value for said investment portfolio at a conclusion of said holding period, and is such that appreciation of said second asset over said holding period is sufficient to generate said protected minimum future value and offset said first feasible loss in value of said first asset;

said protected minimum future value is at least a given fraction of a highest marked-to-market value of achieved by said investment portfolio; and wherein said determining said allocation between said first asset and said second asset employs a formula:

$$R=\max \{(FV/CV-(1-x_1))/((1+r_1)^m-(1-x_1)), \{(FV/CV-(1-x_2))/((1+r_2)^m-(1-x_2))\}$$

where:

R=a fractional allocation of said total investment portfolio to said second asset, FV=said expected minimum future value, CV=an amount available for investment, $x_1$=a fractional representation of said first feasible change in value of said first asset, $r_1$=said first interest rate for said second asset, m=a number of years from a date of investment to a date corresponding to said future value, $x_2$=fractional representation of said second feasible change in value of said first asset, and $r_2$=said second interest rate for said second asset.

3. The method of claim 2, wherein said allocation is rebalanced over time to achieve a target yield to a maturity date for said investment portfolio.

4. A computer-implemented method for managing an investment portfolio, said method comprising:

determining a feasible loss in value of a first asset;

determining an allocation between said first asset and a second asset based on said feasible loss in value of said first asset; and determining a likely change in a future value of said second asset; wherein:

said allocation yields a protected minimum future value for said investment portfolio at a conclusion of said holding period, and is such that appreciation of said second asset over said holding period is sufficient to generate said protected minimum future value and offset said feasible loss in value of said first asset;

said protected minimum future value is at least a given fraction of a highest marked-to-market value of achieved by said investment portfolio; and said determining said allocation considers said likely change in said future value of said second asset and employs a ratio:

$$\frac{(D_v)(\Delta r_v)}{(1+r_s+\Delta r_s)^m - (1+r_s)^m}$$

where:

$D_v$=duration, in years, of said first asset, $\Delta r_v$=a feasible change in yield of said first asset, $r_s$=a yield of said second asset, $\Delta r_s$=a change in $r_s$, that corresponds, over period m, with $\Delta r_v$, and m=years to maturity.

5. The method of claim 4, wherein said allocation is rebalanced over time to achieve a target yield to a maturity date for said investment portfolio.

6. The method of claim 1, wherein said protected minimum future value is greater than or equal to said highest marked-to-market value.

7. The method of claim 2, wherein said protected minimum future value is greater than or equal to said highest marked-to-market value.

8. The method of claim 4, wherein said protected minimum future value is greater than or equal to said highest marked-to-market value.

9. The method of claim 1, wherein said allocation is rebalanced over time to achieve a target yield to a maturity date for said investment portfolio.

* * * * *